United States Patent
Bolender

(10) Patent No.: US 11,481,074 B1
(45) Date of Patent: Oct. 25, 2022

(54) METHOD AND SYSTEM FOR QUADRATURE PROXIMITY SENSING

(71) Applicant: Synaptics Incorporated, San Jose, CA (US)

(72) Inventor: Robert J. Bolender, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/389,811

(22) Filed: Jul. 30, 2021

(51) Int. Cl.
*G06F 3/041* (2006.01)
*G06F 3/044* (2006.01)

(52) U.S. Cl.
CPC ........ *G06F 3/0442* (2019.05); *G06F 3/04166* (2019.05); *G06F 3/0446* (2019.05)

(58) Field of Classification Search
CPC .. G06F 3/0442; G06F 3/0446; G06F 3/04166; G06F 3/03547; G06F 3/0418; G06F 3/04162; G06F 3/04164; G06F 3/041
See application file for complete search history.

(56) References Cited

U.S. PATENT DOCUMENTS

| | | | | |
|---|---|---|---|---|
| 4,504,786 A | * | 3/1985 | Slaughter | G01R 23/16 324/76.39 |
| 5,392,230 A | * | 2/1995 | Christopher | H04N 21/426 708/319 |
| 10,353,518 B2 | | 7/2019 | Petrovic et al. | |
| 2010/0151900 A1 | * | 6/2010 | Koli | H03M 1/1215 341/172 |
| 2012/0068966 A1 | * | 3/2012 | Washburn | G06F 3/0418 345/174 |
| 2013/0207906 A1 | * | 8/2013 | Yousefpor | G06F 3/04166 345/173 |
| 2016/0148034 A1 | * | 5/2016 | Kremin | G06V 40/1306 382/124 |
| 2016/0179243 A1 | * | 6/2016 | Schwartz | G06F 3/0446 345/174 |
| 2017/0123523 A1 | * | 5/2017 | Huang | G06F 3/0418 |
| 2018/0107335 A1 | * | 4/2018 | Petrovic | G06F 3/0442 |

* cited by examiner

*Primary Examiner* — Olga V Merkoulova
(74) *Attorney, Agent, or Firm* — Ferguson Braswell Fraser Kubasta PC

(57) ABSTRACT

A processing system for an input device includes an in-phase and quadrature (I/Q) receiver module including a first and second charge integrators, and first and second demodulator modules. The I/Q receiver module alternates integration of a resulting signal, received from a receiver electrode of the input device, between the first and the second charge integrators in four consecutive quarter cycles, to obtain four consecutive integration results. The four consecutive quarter cycles coincide with one cycle of a local oscillator signal for the first and second demodulator modules. The I/Q receiver module further alternates demodulation of the four consecutive integration results between the first and second demodulator modules. The first demodulator module performs an in-phase demodulation to produce an in-phase component of a sensing signal associated with the first resulting signal, and the second demodulator module performs a quadrature demodulation to produce a quadrature component of the sensing signal.

20 Claims, 8 Drawing Sheets

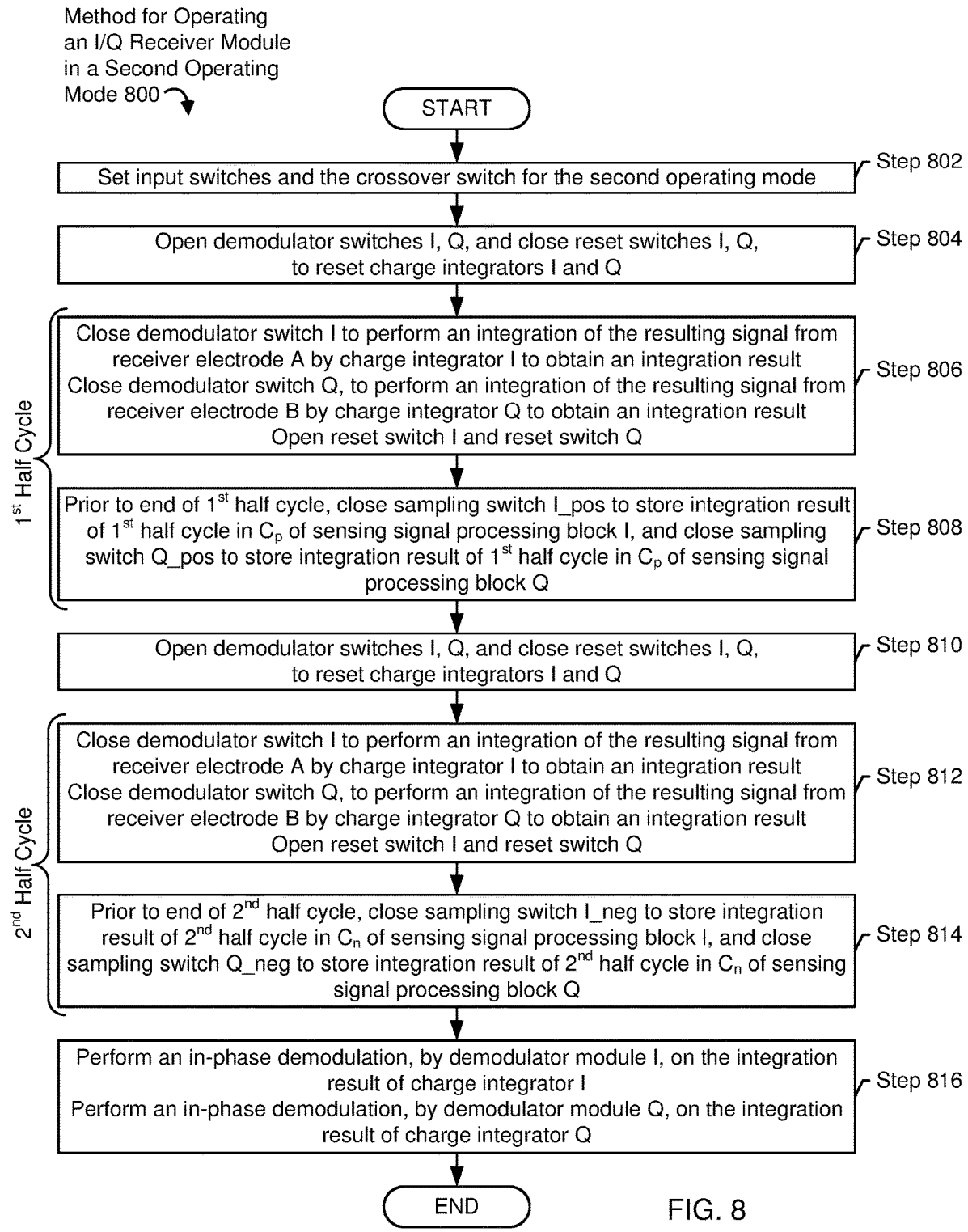

METHOD AND SYSTEM FOR QUADRATURE PROXIMITY SENSING

TECHNICAL FIELD

The described embodiments relate generally to electronic devices, and more specifically, to touch sensors supporting touch input devices such as pens or styli.

BACKGROUND

Input devices including proximity sensor devices (e.g., touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones). Proximity sensor devices may be used to detect fingers, styli, or pens.

SUMMARY

In general, in one aspect, one or more embodiments relate to a processing system for an input device, comprising: an in-phase and quadrature (I/Q) receiver module comprising: a first charge integrator, a second charge integrator, a first demodulator module, and a second demodulator module; and the I/Q receiver module configured to, when in a first operating mode: alternate integration of a first resulting signal, received from a first receiver electrode of the input device, between the first charge integrator and the second charge integrator in four consecutive quarter cycles, to obtain four consecutive integration results, wherein the four consecutive quarter cycles coincide with one cycle of a local oscillator signal for the first demodulator module and the second demodulator module, and alternate demodulation of the four consecutive integration results between the first demodulator module and the second demodulator module, wherein the first demodulator module performs a first in-phase demodulation to produce a first in-phase (I) component of a first sensing signal associated with the first resulting signal, and wherein the second demodulator module performs a quadrature demodulation to produce a quadrature (Q) component of the first sensing signal.

In general, in one aspect, one or more embodiments relate to an input device, comprising: a plurality of receiver electrodes disposed in a sensing region of the input device; and a processing system, comprising: a first in-phase and quadrature (I/Q) receiver module interfacing with a first receiver electrode of the plurality of receiver electrodes and a second receiver electrode of the plurality of receiver electrodes, the first I/Q receiver module comprising: a first charge integrator, a second charge integrator, a first demodulator module, and a second demodulator module; and the first I/Q receiver module configured to, when in a first operating mode: alternate integration of a first resulting signal, received from the first receiver electrode, between the first charge integrator and the second charge integrator in four consecutive quarter cycles, to obtain four consecutive integration results, wherein the four consecutive quarter cycles coincide with one cycle of a local oscillator signal for the first demodulator module and the second demodulator module, and alternate demodulation of the four consecutive integration results between the first demodulator module and the second demodulator module, wherein the first demodulator module performs a first in-phase demodulation to produce a first in-phase (I) component of a first sensing signal associated with the first resulting signal, and wherein the second demodulator module performs a quadrature demodulation to produce a quadrature (Q) component of the first sensing signal.

In general, in one aspect, one or more embodiments relate to a method for operating an input device, the method comprising, when operating in a first operating mode: alternating integration of a first resulting signal, received from a first receiver electrode of the input device, between a first charge integrator and a second charge integrator in four consecutive quarter cycles, to obtain four consecutive integration results, wherein the four consecutive quarter cycles coincide with one cycle of a local oscillator signal for a first demodulator module and a second demodulator module; and alternating demodulation of the four consecutive integration results between the first demodulator module and the second demodulator module, by: performing, by the first demodulator module, a first in-phase demodulation to produce a first in-phase (I) component of a first sensing signal associated with the first resulting signal; and performing, by the second demodulator module, a quadrature demodulation to produce a quadrature (Q) component of the first sensing signal.

Other aspects of the embodiments will be apparent from the following description and the appended claims.

BRIEF DESCRIPTION OF DRAWINGS

FIG. 8 shows a flowchart describing a method for operating an I/Q receiver module in a second operating mode.

DETAILED DESCRIPTION

The following detailed description is exemplary in nature and is not intended to limit the invention or the application and uses of the invention. Furthermore, there is no intention to be bound by any expressed or implied theory presented in the preceding technical field, background, brief summary, brief description of drawings, or the following detailed description.

Throughout the application, ordinal numbers (e.g., first, second, third, etc.) may be used as an adjective for an element (i.e., any noun in the application). With the exception of the four consecutive quarter cycles, the use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The use of the ordinal numbers with respect to the four consecutive quarter cycles denote an ordering within the four consecutive quarter cycle. In particular, the first consecutive quarter cycle is an initial quarter cycle that precedes the second consecutive quarter cycle. The second consecutive quarter cycle precedes the third consecutive quarter cycle, which, in turn, precedes the fourth (i.e., last) consecutive quarter cycle.

Various embodiments provide input devices and methods that may facilitate improved usability along with various other benefits. Embodiments of the invention may be used in conjunction with active pens, in addition to performing touch sensing of other input objects such as fingers. When receiving a signal from an active pen, the phase of the received signal may be unknown, because the active pen is not necessarily synchronized with a local oscillator of the input device. Accordingly, a basic in-phase demodulation, while appropriate for touch sensing, may be suboptimal for demodulating signals received from an active pen. Embodiments of the disclosure enable an in-phase demodulation for touch sensing and a quadrature demodulation for receiving signals from an active pen. Embodiments of the disclosure share components for the in-phase demodulation and the quadrature demodulation. A detailed description is subsequently provided.

Figure 1:
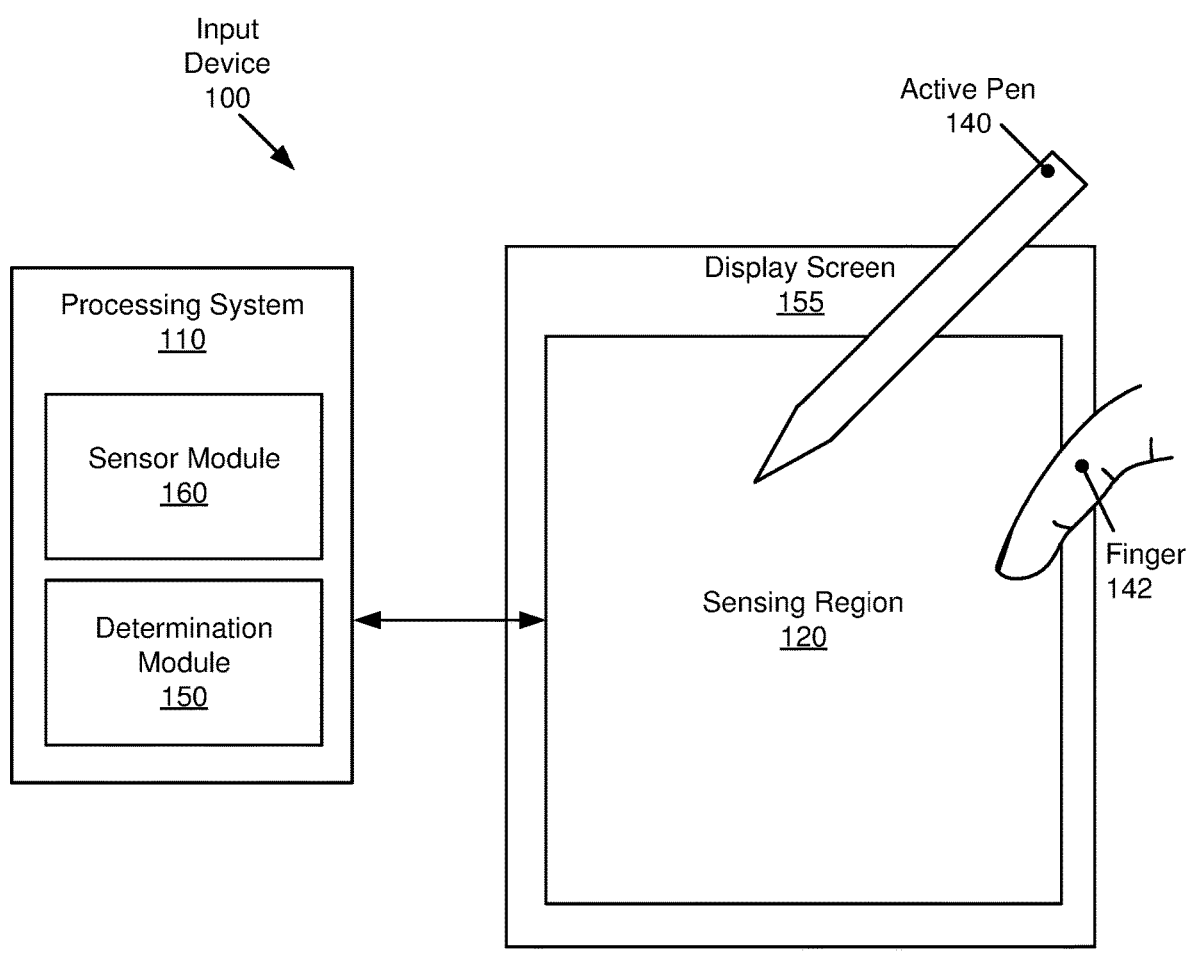
FIG. 1 shows a block diagram of an input device, in accordance with one or more embodiments.

FIG. 1 is a block diagram of an exemplary input device (100), in accordance with embodiments. The input device (100) may be configured to provide input to an electronic system (not shown). As used in this document, the term "electronic system" (or "electronic device") broadly refers to any system capable of electronically processing information. Some non-limiting examples of electronic systems include personal computers, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

In FIG. 1, the input device (100) is shown as a proximity sensor device (e.g., "touchpad" or a "touch sensor device") configured to sense input provided by one or more input objects in a sensing region (120). Example input objects include styli, an active pen (140), and fingers (142). Further, which particular input objects are in the sensing region may change over the course of one or more gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects). The sizes, shapes, and locations of particular sensing regions may vary widely from embodiment to embodiment.

The input device (100) may utilize any combination of sensor components and sensing technologies to detect user input in the sensing region (120). The input device (100) includes one or more sensing elements for detecting user input. The sensing elements may be capacitive.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitance sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. A processing system may further include receiver circuitry configured to receive signals emitted by a different source, e.g., an active pen. The signals by the active pen may be received by the receiver sensor electrodes, while transmit signals are not necessarily emitted by transmitter sensor electrodes.

In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens (155), driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals. The receiver module of the sensor module (160) may receive resulting signals from sensor electrodes in the electrode pattern using a capacitive sensing signal having a sensing frequency, e.g., generated by the transmitter module. The resulting signals may include desired signals, such as active pen data or signal components caused by an input object being in proximity to the electrode pattern, or undesired signals, such as noise or interference. As will be described in greater detail below, the sensor module (160) may perform one or more demodulation operations on the resulting signal. In one embodiment, the sensor module (160) performs a single waveform demodulation on the resulting signal. In one embodiment, the sensor module (160) performs a quadrature (I/Q) demodulation of the resulting signal. In this case, the sensor module (160) may use orthogonal demodulation waveforms to obtain an in-phase (I) component of the resulting signal and an out-of-phase (Q) (e.g., 90° out-of-phase) component of the resulting signal. In one or more embodiments, the sensor module (160) is configurable to perform a single waveform demodulation and an I/Q demodulation using shared components, as further described below in reference to FIGS. 2 and 3.

Although FIG. 1 shows a determination module (150) and a sensor module (160), alternative or additional modules may exist in accordance with one or more embodiments. Such alternative or additional modules may correspond to distinct modules or sub-modules than one or more of the modules discussed above. Example alternative or additional modules include hardware operation modules for operating hardware such as sensor electrodes and display screens (155), data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g., to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

In some embodiments, the input device (100) includes a touch screen interface, and the sensing region (120) overlaps at least part of an active area of a display screen (155). For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

While FIG. 1 shows a configuration of components, other configurations may be used without departing from the scope of the invention. For example, various components may be combined to create a single component. As another example, the functionality performed by a single component may be performed by two or more components.

Figure 2:
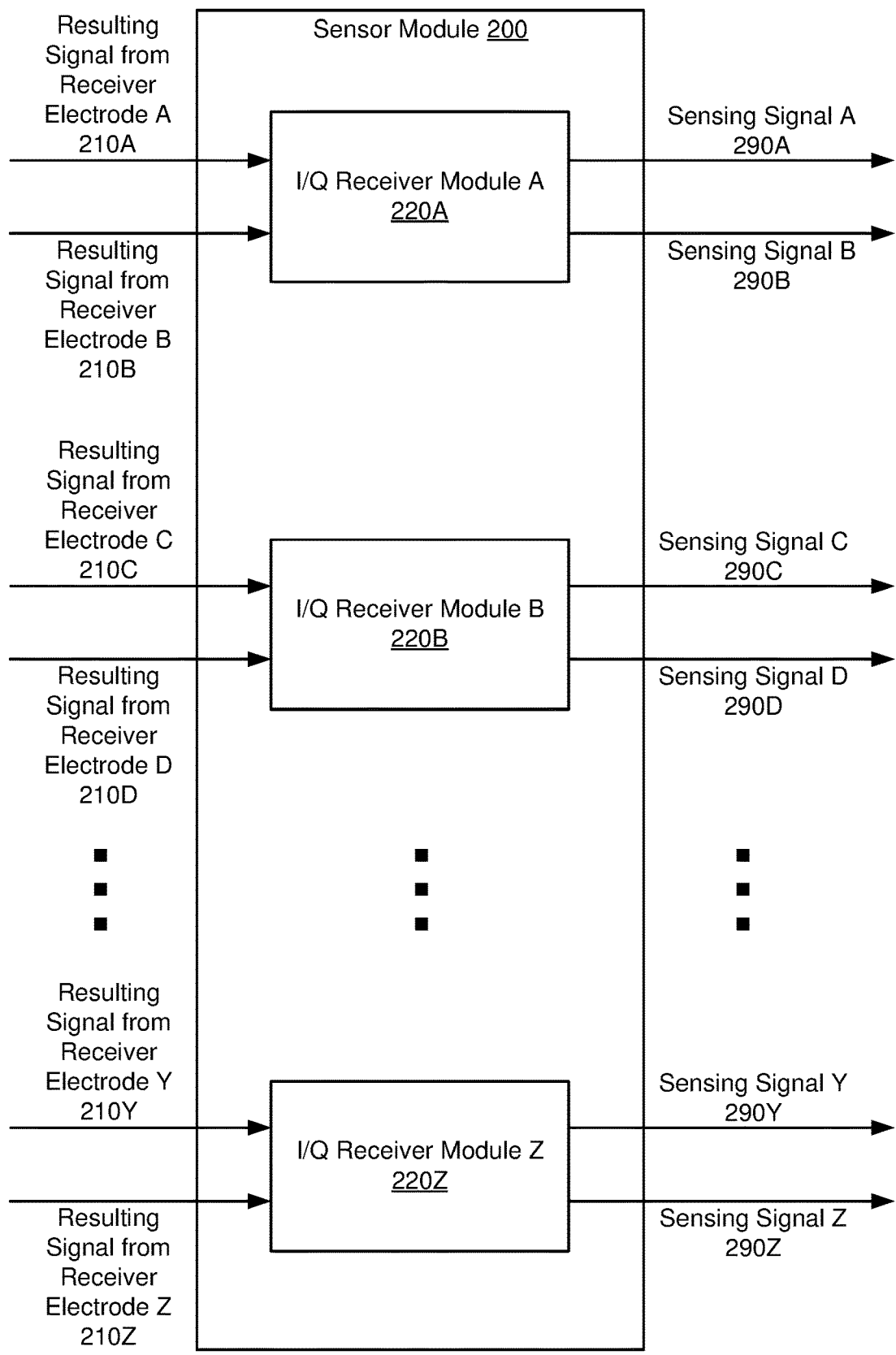
FIG. 2 shows a sensor module, in accordance with one or more embodiments.

FIG. 2 shows a sensor module (200), in accordance with one or more embodiments. The sensor module (200) may be similar to the sensor module (160) in FIG. 1 or may include components of the sensor module (160). In one or more embodiments, the sensor module (200) receives resulting signals from receiver electrodes (210A-210Z). The receiver electrodes may be in the sensing region (120), in FIG. 1. The sensor module (200) processes the resulting signals (210A-210Z) to output sensing signals (290A-290Z). In one or more embodiments, the processing is performed by quadrature (I/Q) receiver modules A-Z (220A-220Z), described in reference to FIG. 3. Each of the I/Q receiver modules A-Z (220A-220Z) may be capable of performing a quadrature demodulation of resulting signals of one receiver electrode to provide an I-component, which is in-phase with a local oscillator signal, and to provide a Q-component, which is out-of-phase (e.g., 90° out-of-phase) with the local oscillator signal. Each of the I/Q receiver modules A-Z (220A-220Z) may also be capable of performing in-phase demodulations of resulting signals from two different receiver electrodes to provide two I-components, one for each of the two resulting signals. Accordingly, each of the I/Q receiver modules (220A-Z), in one or more embodiments, is configurable for different operating modes, which are subsequently described.

Referring to the I/Q receiver module A (220A), when operating in a first operating mode, the I/Q receiver module A (220A) receives the resulting signal from receiver electrode A (210A) or the resulting signal from receiver electrode B (210B), or the combined resulting signals from receiver electrodes A and B (210A, 210B). The I/Q receiver module A (220A), when in the first operating mode, generates the sensing signal A (290A) and the sensing signal B (290B), reflecting information obtained by integrating and demodulating resulting signals A or B, or A and B combined (210A, 210B). More specifically, the sensing signal A (290A) is an in-phase (I) component, and the sensing signal B (290B) is an out-of-phase (Q) component obtained by the I/Q receiver module A (220A). Obtaining of the I-component and the Q component by the I/Q receiver module A (220A) and the implications of obtaining I and Q-components is described below.

The first operating mode involves performing a quadrature-phase demodulation for a resulting signal from a single receiver electrode and may be used for cases where the phase of the resulting signal is not known. For example, in active pen data reception or interference measurements, the phase may be unknown relative to the local oscillator signal. In such a case, the magnitude of the sensing signal after demodulation may vary depending on relative phase (i.e., phase offset) of the resulting signal and the sampling and demodulation timing. As a result, single-phase demodulation may result in a varying and inaccurate magnitude of the sensing signal, which may result in erroneous downstream processing. Accordingly, in one or more embodiments, a quadrature-phase demodulation is used to allow determination of the resulting signal magnitude (and phase) regardless of the phase offset.

The second operating mode involves performing an in-phase demodulation for resulting signal from two receiver electrodes and may be used for cases where the phase of the resulting signals is known. For example, the second operating mode may be used for touch sensing. When in the second operating mode, the I/Q receiver module A (220A) receives the resulting signal from receiver electrode A (210A) and the resulting signal from the receiver electrode B (210B) as inputs. Each of the resulting signals from receiver electrodes A and B (210A, 210B) may be a function of one or more of (i) a transmitter signal emitted for capacitive sensing, which may be have the same or substantially the same frequency and phase as the local oscillator signal), (ii) user input, if any, in the sensing region (120), and (iii) interference, if any, from one or more sources. The I/Q receiver module A (220A), when in the second operating mode, generates a sensing signal A (290A) and a sensing signal B (290B), reflecting the resulting signals from receiver electrodes A and B (210A, 210B), respectively. More specifically, the sensing signals A and B (290A, 290B) are in-phase (I) components, obtained by the I/Q receiver module A (220A). An extensive description of the obtaining of the I-components by the I/Q receiver module A (220A) and the implications of obtaining I-components is provided below.

In the second operating mode, performing a single-phase (I-phase) demodulation for each of the two resulting signals may be used for touch sensing, where the phase of the resulting signal may be known. For example, the phase of the resulting signal may be known based on the transmitter timing (e.g., the timing of the local oscillator signal may be used by the sensor module (160) to drive the transmitter electrodes for touch sensing). As a result of the known timing, consistent measurements of the resulting signals may be obtained using single-phase measurements (e.g., by using the I-components as the sensing signals).

In one or more embodiments, the I/Q receiver module A (220A) may be controlled to operate in either the first or the second operating mode. A description of how a switching between the first and the second operating mode may be performed is provided below, in reference to FIG. 3.

The other I/Q receiver modules B ... Z (220B ... Z) may operate in a similar manner. The number of I/Q receiver modules (220A-220Z) of the sensor module may depend on the number of receiver electrodes in the sensing region (120). For example, assuming that all receiver electrodes are interfacing with the sensor module (200), as shown in FIG. 2, the number of I/Q receiver modules may be half the number of receiver electrodes, with each I/Q receiver module serving two receiver electrodes.

Figure 3:
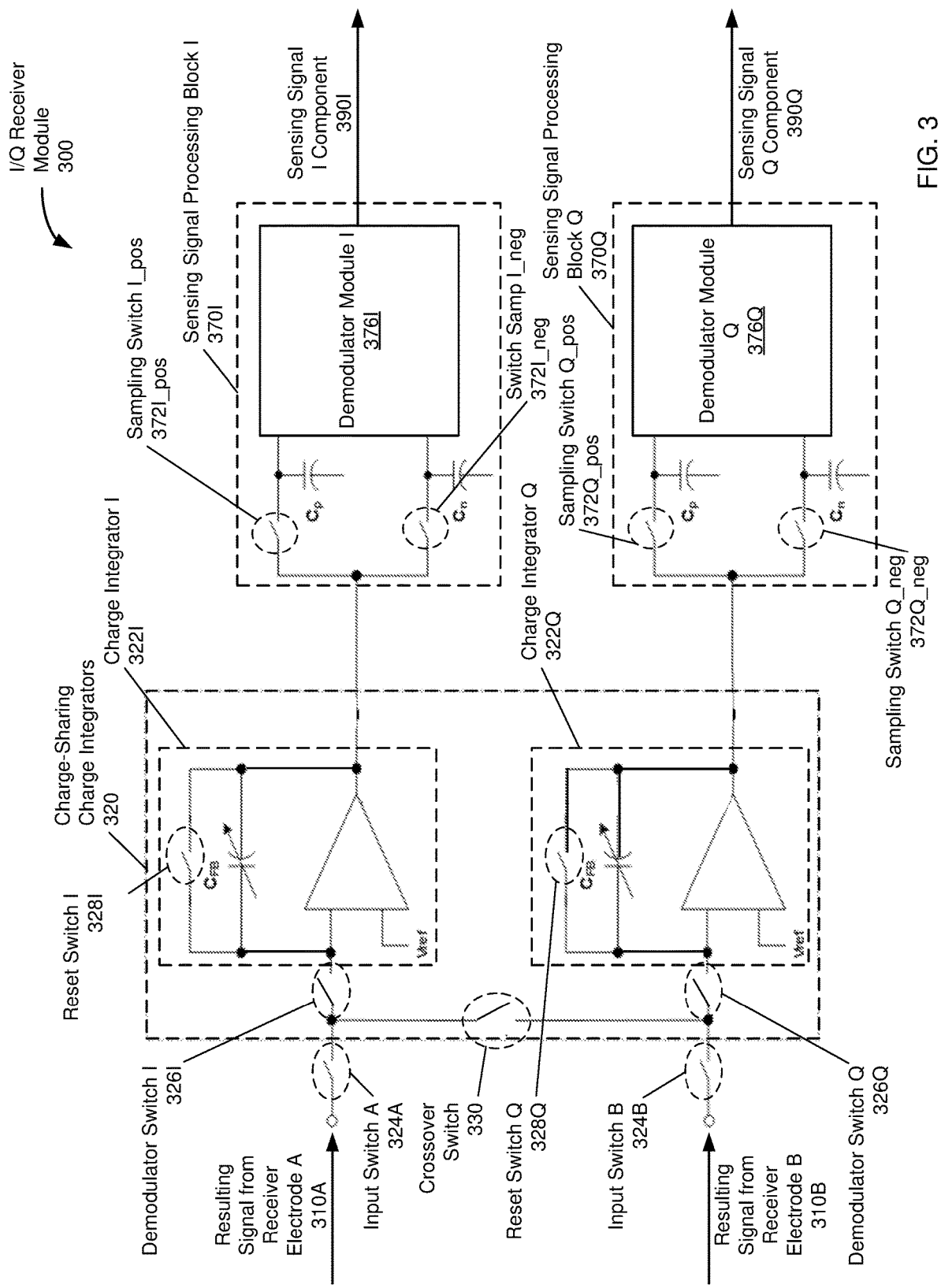
FIG. 3 shows a quadrature (I/Q) receiver module, in accordance with one or more embodiments.

FIG. 3 schematically shows a quadrature (I/Q) receiver module (300), in accordance with one or more embodiments. The I/Q receiver module (300) may operate in different operating modes, as noted in reference to FIG. 2. The various switches shown in FIG. 3, described below, may be used to reconfigure the I/Q receiver module (300) to operate in the first or the second operating mode.

The following paragraphs describe the components of the I/Q receiver module (300), followed by a discussion of the operation of the components to operate the I/Q receiver module (300) in the first operating mode and the second operating mode, respectively.

The I/Q receiver module (300) of FIG. 3 includes charge-sharing charge integrators (320), a sensing signal processing block I (370I), and a sensing signal processing block Q (370Q). The I/Q receiver module (300), in one or more embodiments, further includes input switch A (324A), input switch B (324B), a reset switch I (328I), a reset switch Q (328Q), crossover switch (330), sampling switches I_pos, I_neg, Q_pos, and Q_neg (372I_pos, 372I_neg, 372Q_pos, 372Q_neg). Each of these components is subsequently discussed.

The charge-sharing charge integrators (320) include a charge integrator I (322I) and a charge integrator Q (322Q). Charge integrators I and Q (322I, 322Q) receive a resulting signal from a receiver electrode A (310A) and/or a resulting signal from a receiver electrode B (310B). Which resulting signals are received by the charge integrators depends on the configuration of the various switches shown in FIG. 3. More specifically, the configuration of the input switches A and B (324A, 324B) and the crossover switch (330) determine which resulting signals are provided to the charge integrators (322I, 322Q), as discussed below in reference to the timing diagram (500) of FIG. 5.

Figure 5:
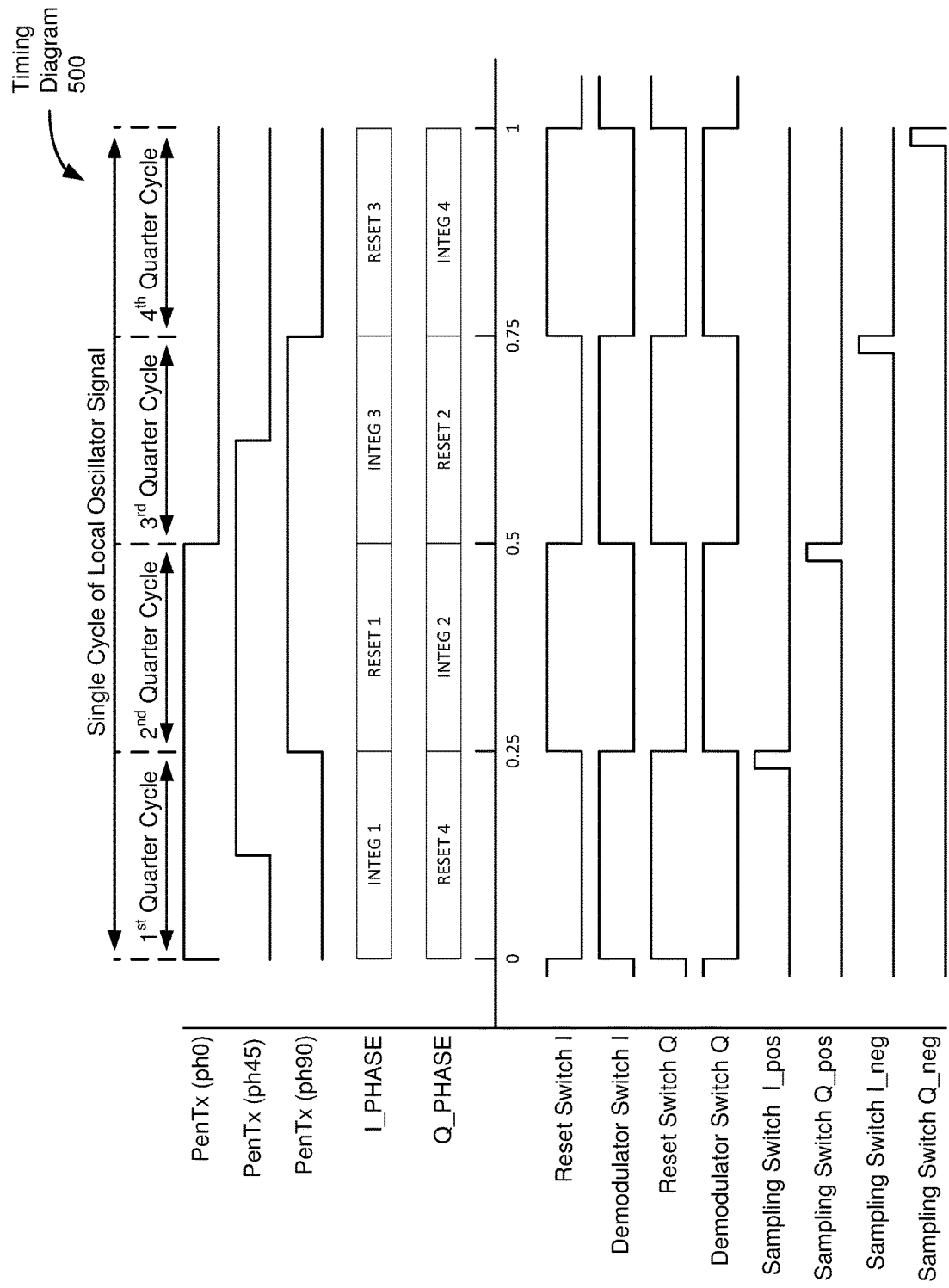
FIG. 5 shows a timing diagram, in accordance with one or more embodiments.

Each of the charge integrators I and Q (322I, 322Q) may output the charge accumulated from the resulting signal from the receiver electrode A and/or B (310A, 310B) over an integration time interval, for example, as further discussed in reference to the timing diagram (500) of FIG. 5. The charge integrators I and Q (322I, 322Q) may be reset using the reset switches I and Q (328I, 328Q), respectively.

In one or more embodiments, the outputs of the charge integrators I and Q (322I, 322Q) (i.e., the integration results) are provided to the sensing signal processing blocks I and Q (370I, 370Q). For example, the output of charge integrator I (322I) may be provided to sensing signal processing block I (370I), and the output of charge integrator Q (322Q) may be provided to sensing signal processing block Q (370Q).

The sensing signal processing block I (370I), in one or more embodiments, includes sampling switches I_pos and I_neg (372I_pos, 372I_neg), hold capacitors $C_p$ and $C_n$, and a demodulator module I (376I). The sensing signal processing block Q (370Q), in one or more embodiments, includes sample switches Q_pos and Q_neg (372Q_pos, 372Q_neg), hold capacitors $C_p$ and $C_n$, and a demodulator module Q (376Q).

The demodulator modules (376I, 376Q) may perform a demodulation of the signals obtained from the charge integrators I and/or Q (322I, 322Q), respectively, to output sensing signal components I and Q (390I, 390Q), respectively. The demodulator modules (376I, 376Q) are described below, in reference to FIG. 4.

In one or more embodiments, sample switch I_pos (372I_pos) in combination with hold capacitor $C_p$, sample switch I_neg (372I_neg) in combination with hold capacitor $C_n$, sample switch Q_pos (372Q_pos) in combination with $C_n$, and sample switch Q_neg (372Q_neg) in combination with hold capacitor $C_n$, provide stable inputs to the demodulation modules I and Q (376I, 376Q), in presence of switching activity by the various switches, as discussed in reference to the timing diagram of FIG. 5.

In combination, the elements of the I/Q receiver module (300), provide a configurable processing of the input signals from receiver electrodes A and or B (310A, 310B), to output sensing signal components I and Q (390I, 390Q), in one operating mode. In another operating mode, the various switches enable the I/Q receiver module (300) to output signals other than the signal components I and Q (390I, 390Q), as discussed in reference to FIG. 5.

Figure 4:
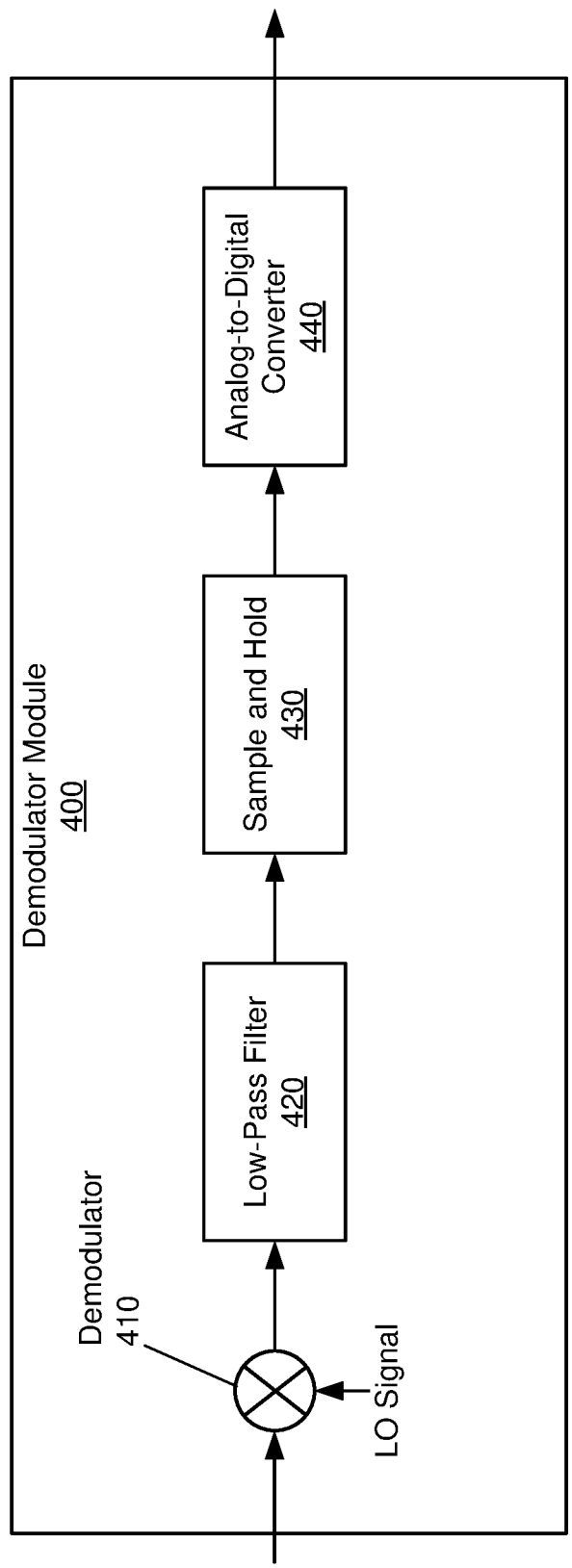
FIG. 4 shows a demodulator module, in accordance with one or more embodiments.

FIG. 4 schematically shows a demodulator module, in accordance with one or more embodiments. An input is received to the demodulator (410). Referring to FIG. 3, the input may be received from the hold capacitors $C_p$ and $C_n$, previously described in reference to FIG. 3. The demodulator (410) may be an analog mixer, e.g., a multiplier multiplying the input with a demodulation waveform to demodulate the input. The demodulation waveform may be the previously introduced local oscillator (LO) signal.

In one or more embodiments, in order to perform an in-phase (I) demodulation to generate an in-phase component of the demodulated signal, the demodulation waveform is phase-aligned (0° phase offset) with the waveform of the transmitter signal emitted for the capacitive sensing. Specifically, the LO signal may be used as the waveform of the transmitter signal and as the demodulation waveform.

In one or more embodiments, in order to perform an out-of-phase or quadrature (Q) demodulation to generate an out-of-phase component of the demodulated signal, the demodulation waveform has a phase offset (e.g., a 90° phase offset) relative to the waveform used for the in-phase (I) demodulation.

Accordingly, the demodulation block may perform either an in-phase (I) demodulation (e.g., when operating as part of the demodulation module I (376I)) or a quadrature (Q) demodulation (e.g. when operating as part of the demodulation module Q (376Q)), depending on whether the demodulation waveform has a 0° phase offset or a 90° phase offset.

The output of the demodulator (410) may pass through a low-pass filter (420), a sample and hold (430), and an analog-to-digital (A/D) converter (440) to provide a digital output of the demodulated signal.

FIG. 5 shows a timing diagram (500), in accordance with one or more embodiments. The timing diagram enables a simultaneous I/Q sensing using the I/Q receiver module (300) of FIG. 3. Depending on which input switch(es) (324A, 324B) and the state of the crossover switch (330), the simultaneous I/Q sensing may be performed on the resulting signal from receiver electrode A (310A), and/or on the resulting signal from receiver electrode B (310B). More specifically, when input switch (324A) is closed, input switch (324B) is open, and the crossover switch (330) is closed, the simultaneous I/Q sensing may be performed on the resulting signal from receiver electrode A (310A). When input switch (324B) is closed, input switch (324A) is open, and the crossover switch (330) is closed, the simultaneous I/Q sensing may be performed on the resulting signal from receiver electrode B (310B). When input switches (324A, 324B) and the crossover switch (330) are closed, the simultaneous I/Q sensing may be performed on the resulting signal from receiver electrodes A and B (310A, 310B) combined. Applications of these configurations are described in reference to FIG. 6B.

The described I/Q sensing operates based on quarter cycles of the local oscillator signal. In other words, a single cycle of the resulting signal is processed in four segments, as illustrated in the timing diagram (500): a first quarter cycle, a second quarter cycle, a third quarter cycle, and a fourth quarter cycle.

As illustrated in the timing diagram (500), showing different alignments between the local oscillator signal and the resulting signal (examples show an emission of an active pen with a 0° phase offset, PenTx(ph0), a 45° phase offset, PenTx(ph45), and a 90° phase offset, PenTx(ph90)), no particular alignment between the resulting signal and the local oscillator signal is necessary. In the example, the frequency of the local oscillator signal may be identical or close to the frequency of the emissions by the active pen. For example, the frequency may be set to a value in a range between 50 kHz and 500 kHz, while there may be any degree of phase offset.

In one or more embodiments, the processing in quarter cycles alternates operations performed for an in-phase (I) component (I_PHASE), and a quadrature (Q) component (Q_PHASE). Accordingly, the timing diagram (500) may be used in conjunction with an I/Q receiver module such as shown in FIG. 3, where two integrators (e.g., one for the I component, and one for the Q component) are available. More specifically, an integration (INTEG 1) is performed for the I component during the first quarter cycle. Next, an integration (INTEG 2) is performed for the Q component during the second quarter cycle, followed by an integration (INTEG 3) performed for the I component during the third quarter cycle, and an integration (INTEG 4) performed for the Q component during the fourth quarter cycle. Accordingly, subsequent integrations continuously alternate between being performed for the I component and the Q component. Further, while an integration is performed for the I component, a reset of the integrator for the Q component may be performed. For example, while INTEG 2 is performed for the Q component, a RESET 1 is performed for the I component, thereby erasing the integration result obtained by the previous execution of INTEG 1. In one or more embodiments, the alternating operations performed for the I component and the Q component enable an integration time interval that is not shortened by the need for an integrator reset, in comparison to non-alternating operations, where only part of a quarter cycle would be available for integration, to accommodate the reset, immediately following the integration, within the quarter cycle. Accordingly, the alternating operations as shown in the timing diagram (500), in accordance with one or more embodiments, provide more integration time, thereby improving the settling of the integrator operations, prior to readout by the demodulators. In comparison to the incomplete integration resulting from non-alternating operations, no signal is lost, thereby resulting in a higher signal to noise ratio (SNR), for increased performance of the overall I/Q demodulation.

In one or more embodiments, the alternating operation is performed by coordinating operation of various switches, as shown in the timing diagram (500). Specifically, the timing diagram provides traces for the operation of the following switches over time: reset switch I (328I), demodulator switch I (326I), reset switch Q (328Q), demodulator switch Q (326Q), sampling switch I_pos (372I_pos), sampling switch Q_pos (372Q_pos), sampling switch I_neg (372I_neg), and sampling switch Q_neg (372Q_neg). In the timing diagram (500), a switch is considered to be in the "closed" position when the corresponding trace is "high", and the switch is considered to be in the "open" position when the corresponding trace is "low".

During the first quarter cycle, reset switch I (328I) is open to allow the charge integrator I (322I) to perform an integration. Demodulator switch I (326I) is closed for the charge integrator I (322I) to receive the resulting signal(s) from receiver electrode(s) A and/or B (310A, 310B). Accordingly, the integrator I (322I) performs an integration of the resulting signal(s) from receiver electrode(s) A and/or B (310A, 310B), during the first quarter cycle. Before the first quarter cycle concludes, sampling switch I_pos (372I_pos) briefly closes to sample the integration result obtained by the integrator I (322I), by storing the corresponding voltage in the hold capacitor $C_p$ of the sensing signal processing block I (370I). Further, during the first quarter cycle, the reset switch Q (328Q) is closed, while the demodulator switch Q (326Q) is open, thereby resetting the charge integrator Q (322Q).

During the second quarter cycle, reset switch Q (328Q) is open to allow the charge integrator Q (322Q) to perform an integration. Demodulator switch Q (326Q) is closed for the charge integrator Q (322Q) to receive the resulting signal(s) from receiver electrode(s) A and/or B (310A, 310B). Accordingly, the integrator Q (322Q) performs an integration of the resulting signal(s) from receiver electrode(s) A and/or B (310A, 310B), during the second quarter cycle. Before the second quarter cycle concludes, sampling switch Q_pos (372Q_pos) briefly closes to sample the integration result obtained by the integrator Q (322Q), by storing the corresponding voltage in the hold capacitor $C_p$ of the sensing signal processing block Q (370Q). Further, during the second quarter cycle, the reset switch I (328I) is closed, while the demodulator switch I (326I) is open, thereby resetting the charge integrator I (322I).

During the third quarter cycle, reset switch I (328I), demodulator switch I (326I), reset switch Q (328Q), and demodulator switch Q (326Q) are in the configuration described for the first quarter cycle. Accordingly, the integrator I (322I), again, performs an integration of the resulting signal(s) from receiver electrode(s) A and/or B (310A, 310B), during the third quarter cycle, while the charge integrator Q (322Q) is reset. Before the third quarter cycle concludes, sampling switch I_neg (372I_neg) briefly closes to sample the integration result obtained by the integrator I (322I), by storing the corresponding voltage in the hold capacitor $C_n$ of the sensing signal processing block I (370I).

During the fourth quarter cycle, reset switch I (328I), demodulator switch I (326I), reset switch Q (328Q), and demodulator switch Q (326Q) are in the configuration described for the second quarter cycle. Accordingly, the integrator Q (322Q), again, performs an integration of the resulting signal(s) from receiver electrode(s) A and/or B (310A, 310B), during the fourth quarter cycle, while the charge integrator I (322I) is reset. Before the fourth quarter cycle concludes, sampling switch Q_neg (372Q_neg) briefly closes to sample the integration result obtained by the integrator Q (322Q), by storing the corresponding voltage in the hold capacitor $C_p$ of the sensing signal processing block Q (370Q).

During the alternating operation of the charge integrator I (322I) and the charge integrator Q (322Q), an integration result for each of the first, second, third, and fourth quarter cycles, thus, become available for demodulation by the sensing signal processing blocks I and Q (370I, 370Q). The demodulator module I (376I) may operate on the voltages stored in the hold capacitors $C_p$ and $C_n$ of the sensing signal processing block I (370I), and the demodulator module Q (376Q) may operate on the voltages stored in the hold capacitors $C_p$ and $C_n$ of the sensing signal processing block Q (370Q). The demodulator module I (376I) may perform an I demodulation (as previously described, e.g., in reference to FIG. 4) to output the sensing signal I component (390I), whereas the demodulator module Q (376Q) may perform a Q demodulation (as previously described, e.g., in reference to FIG. 4) to output the sensing signal Q component (390Q). In combination, the sensing signal I component (390I) and the sensing signal Q component (390Q) enable reconstruction of the amplitude of the sensing signal regardless of the phase offset between the resulting signal and the local oscillator signal, as it may occur, for example, when the resulting signal is associated with an active pen that is not synchronized with the I/Q receiver module.

Figure 6A:
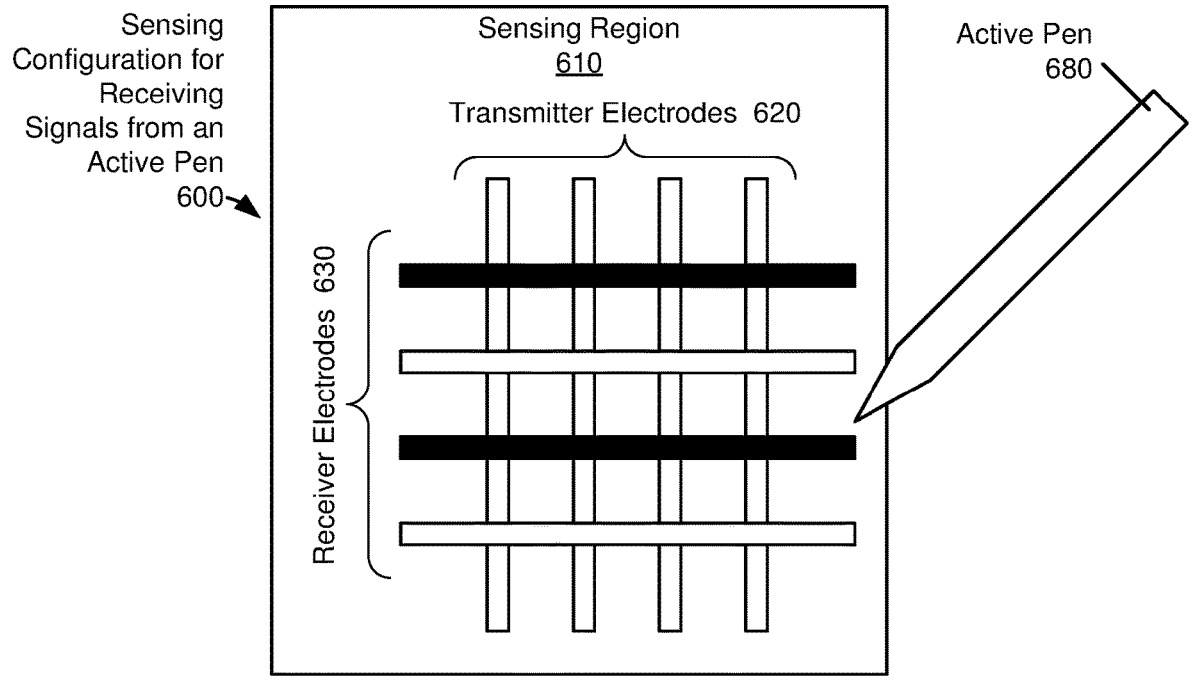
FIG. 6A shows a sensing configuration for receiving signals from an active pen, in accordance with one or more embodiments.
Figure 6B:
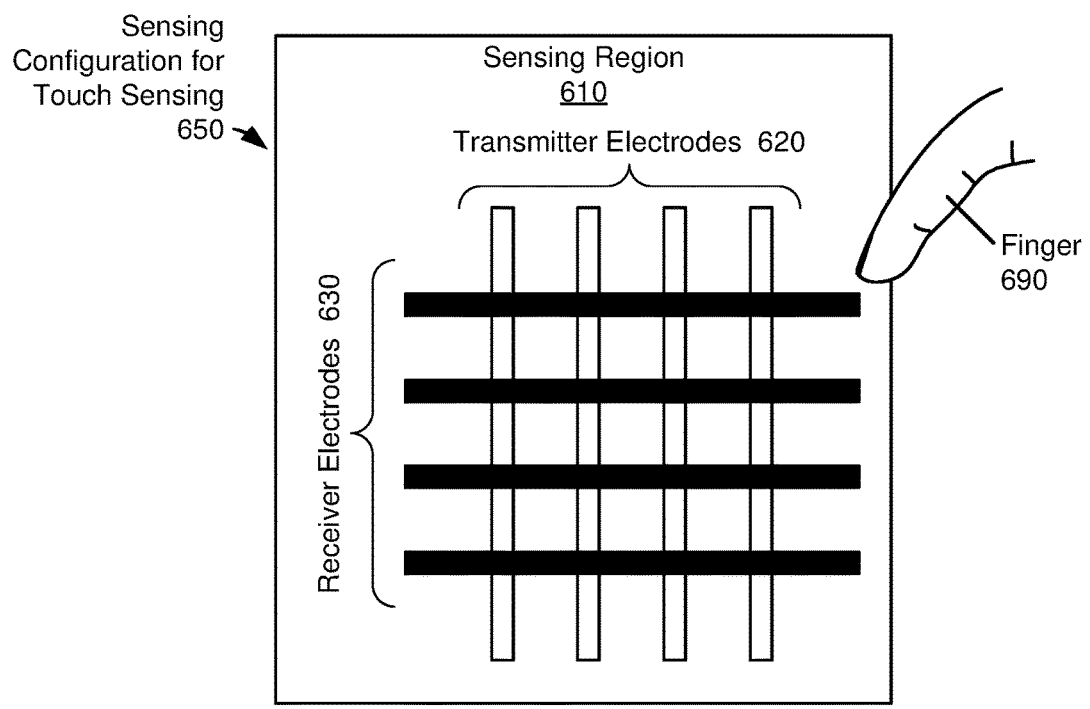
FIG. 6B shows a sensing configuration for a touch sensing, in accordance with one or more embodiments.

FIGS. 6A and 6B show sensing configurations (600, 650), in accordance with one or more embodiments. Each of the sensing configurations (600, 650) may be based on a sensing region (610) that may include transmitter electrodes (620) and receiver electrodes (630). The transmitter electrodes (620) may be driven as initially described in reference to FIG. 1. In one or more embodiments, the receiver electrodes (630) are electrically connected to a sensor module as shown in FIG. 2. More specifically, pairs of receiver electrodes may be assigned to individual I/Q receiver modules.

Now referring to FIG. 6A, showing a sensing configuration (600) for receiving signals from an active pen (680), a subset of resulting signals associated with a subset of receiver electrodes is processed by the I/Q receiver modules. More specifically, due to the unknown phase of the signal emitted by the pen, an I/Q demodulation, as previously described in reference to FIGS. 3, 4, and 5, may be performed. Assume that, in the example shown in FIG. 6A, the receiver electrodes color coded in black provide resulting signals to the I/Q receiver module, whereas the I/Q receiver module does not operate on the resulting signals from the receiver electrodes color coded in white. Which resulting signals from which electrodes are processed may be determined based on the configuration of the input switches A and B (324A, 324B) and the crossover switch (330). However, as shown in FIG. 6A, the spatial resolution may be lost, because only resulting signals from a subset of receiver electrodes may be processed. The reduced spatial resolution may be acceptable to receive signals emitted by an active pen, because the signals emitted by the pen may not be position related. For example, the signals emitted by the pen may encode button presses, force, etc. Also, the full spatial resolution may be available if the I/Q receiver module alternatingly connect to different electrodes, e.g., using the input switches (324A, 324B). In such a configuration, the temporal resolution may be reduced.

Turning to FIG. 6B, a sensing configuration (650) for touch sensing, in accordance with one or more embodiments, is shown. The sensing configuration (650) may be used to detect presence and/or location of a finger (690) or any other passive, i.e., non-transmitting, input object. Unlike in the sensing configuration (600) in FIG. 6A, in the sensing configuration (650) in FIG. 6B, resulting signals from all receiver electrodes (color coded in black) may be processed by the I/Q receiver module (300). More specifically, both input switches (324A, 324B) may be closed, whereas the crossover switch (330) may be open, thus enabling an independent demodulation of the resulting signals obtained from the receiver electrodes. In this configuration, the demodulations may all be in-phase (I) demodulations, with no quadrature (Q) demodulation. The I demodulations may be sufficient for touch sensing because the phase of the sensing signal (emitted by the transmitter electrodes) is known. Accordingly, a full-spatial, full-temporal resolution sensing may be performed.

As FIGS. 6A and 6B illustrate, the same set of integrators and demodulators may be used for touch sensing (FIG. 6B) as well as for receiving signals from an active pen (FIG. 6A), without requiring additional integrators and/or demodulators. While FIGS. 6A and 6B show a particular arrangement of transmitter electrodes and receiver electrodes, other arrangements may be used, without departing from the disclosure. Further, the electrodes may be operated in a transcapacitance sensing mode or an absolute capacitance sensing mode.

Figure 7:
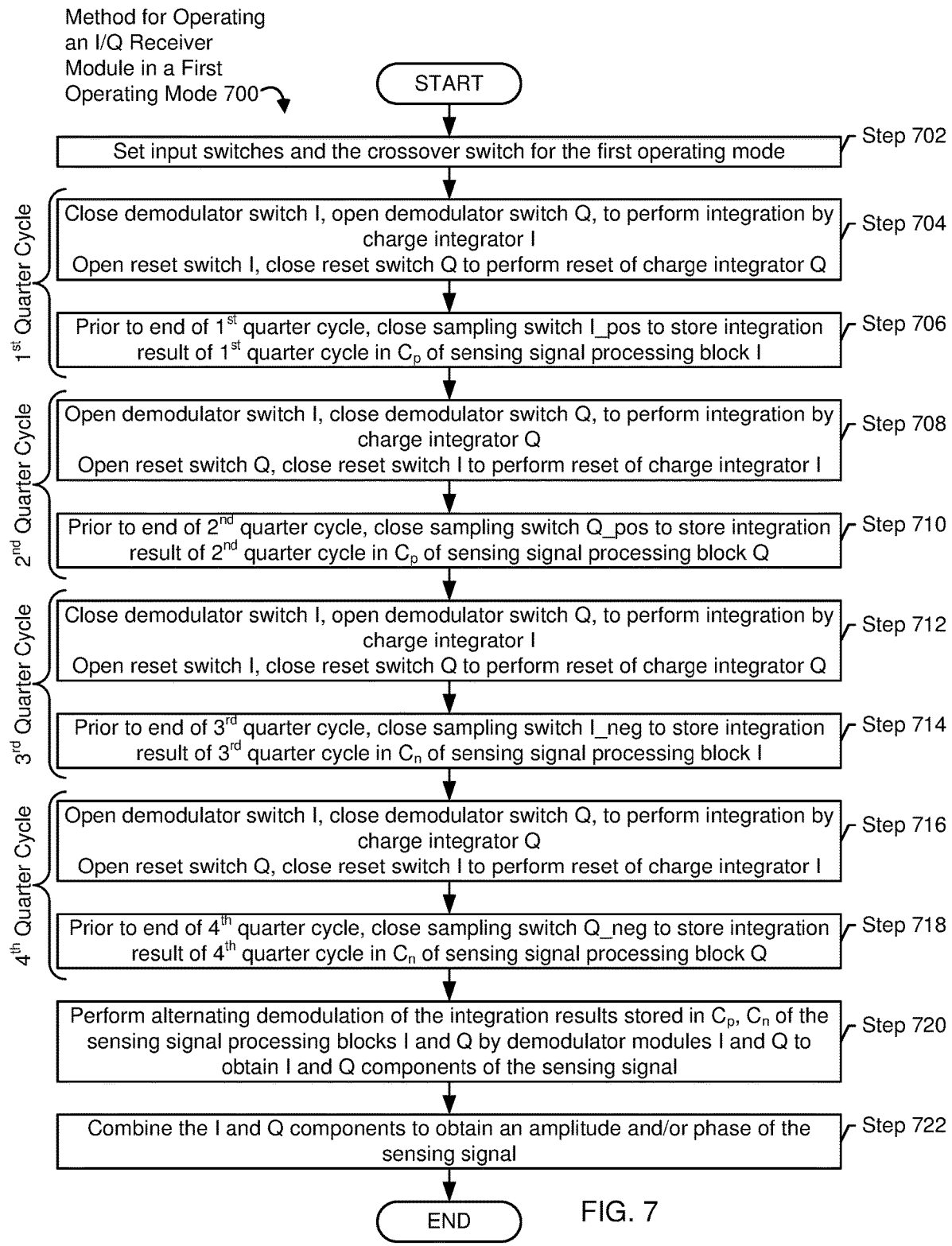
FIG. 7 shows a flowchart describing a method for operating an I/Q receiver module in a first operating mode.

FIGS. 7 and 8 show flowcharts in accordance with one or more embodiments. One or more of the steps in FIGS. 7 and 8 may be performed by the components discussed above in reference to FIGS. 1, 2, 3, and 4. While the various steps in these flowchart are presented and described sequentially, one of ordinary skill will appreciate that at least some of the blocks may be executed in different orders, may be combined or omitted, and some of the blocks may be executed in parallel. Additional steps may further be performed. Accordingly, the scope of the disclosure should not be considered limited to the specific arrangement of steps shown in FIGS. 7 and 8.

The flowchart of FIG. 7 depicts a method for operating an I/Q receiver module in a first operating mode. In the first operating mode, the I/Q receiver module may operate on a single resulting signal to perform a simultaneous I/Q sensing.

Also referring to the circuit diagram of FIG. 3, in Step 702, the input switches and the crossover switch are set. The input switches may be set as follows. When input switch A is closed and input switch B is open, the simultaneous I/Q sensing may be performed on the resulting signal from receiver electrode A. When input switch B is closed and input switch A is open, the simultaneous I/Q sensing may be performed on the resulting signal from receiver electrode B. When input switches A and B are closed, the simultaneous I/Q sensing may be performed on the resulting signal from receiver electrodes A and B combined. Input switches A and B may remain in the selected configuration throughout the simultaneous I/Q sensing. Further, throughout the simultaneous I/Q sensing, the crossover switch may remain closed.

In Step 704, throughout the first quarter cycle of the simultaneous I/Q sensing, demodulator switch I is closed, and demodulator switch Q is open, to perform an integration of the resulting signal by charge integrator I. The reset switch I is open, whereas the reset switch Q is closed to reset charge integrator Q.

In Step 706, prior to end of the first quarter cycle, sampling switch I_pos is closed to store the integration result obtained by charge integrator I during the $1^{st}$ quarter cycle in $C_p$ of sensing signal processing block I.

In Step 708, throughout the second quarter cycle of the simultaneous I/Q sensing, demodulator switch Q is closed, and demodulator switch I is open, to perform an integration of the resulting signal by charge integrator Q. The reset switch Q is open, whereas the reset switch I is closed to reset charge integrator I.

In Step 710, prior to end of the second quarter cycle, sampling switch Q_pos is closed to store the integration result obtained by charge integrator Q during the second quarter cycle in $C_p$ of sensing signal processing block Q.

In Step 712, throughout the third quarter cycle of the simultaneous I/Q sensing, demodulator switch I is closed, and demodulator switch Q is open, to perform an integration of the resulting signal by charge integrator I. The reset switch I is open, whereas the reset switch Q is closed to reset charge integrator Q.

In Step 714, prior to end of the third quarter cycle, sampling switch I_neg is closed to store the integration result obtained by charge integrator I during the 1st quarter cycle in $C_n$ of sensing signal processing block I.

In Step 716, throughout the fourth quarter cycle of the simultaneous I/Q sensing, demodulator switch Q is closed, and demodulator switch I is open, to perform an integration of the resulting signal by charge integrator Q. The reset switch Q is open, whereas the reset switch I is closed to reset charge integrator I.

In Step 718, prior to end of the fourth quarter cycle, sampling switch Q_neg is closed to store the integration result obtained by charge integrator Q during the $4^{th}$ quarter cycle in $C_n$ of sensing signal processing block Q.

After execution of Steps 702-718, four consecutive integration results (for the first, second, third, and fourth quarter cycle) are stored in the holding capacitors for subsequent demodulation in Step 720.

In Step 720, an alternating demodulation may be performed by the demodulator modules I and Q. More specifically, demodulator module I may operate on the integration results stored in $C_p$ and $C_n$ of sensing signal processing block I, and demodulator module Q may operate on the integration results stored in $C_p$ and $C_n$ of sensing signal processing block Q. The result of the alternating demodulation may be an I component of the sensing signal and a Q component of the sensing signal.

In Step 722, the I and Q components of the sensing signal may be processed to determine an amplitude and/or phase of the sensing signal.

Additional steps may follow. For example, in configurations that use the simultaneous I/Q sensing in conjunction with an active pen, the sensing signal may be processed to extract a message emitted by the active pen from the sensing signal. The message may encode, for example, pen button click activity, pen force information, etc. The encoding may use, for example, a phase shift keying.

The flowchart of FIG. 8 depicts a method for operating an I/Q receiver module in a second operating mode. In the second operating mode, the I/Q receiver module may operate on two resulting signals to perform a simultaneous I sensing on both resulting signals. The operations are performed in two consecutive half-cycles of the local oscillator signal.

Referring also to the circuitry of FIG. 3 in addition to FIG. 8, in Step 802, the input switches and the crossover switch are set. Input switches A and B may be closed and the crossover switch may remain open for simultaneous and independent I sensing on the resulting signals from receiver electrodes A and B.

In Step 804, demodulator switches I and Q are opened and reset switches I and Q are closed to reset charge integrators I and Q.

In Step 806, reset switches I and Q are opened. Demodulator switch I is closed to perform an integration of the resulting signal from receiver electrode A by charge integrator I to obtain an integration result. Further, demodulator switch Q is closed to perform an integration of the resulting signal from receiver electrode B by charge integrator Q to obtain an integration result.

In Step 808, prior to end of the first half cycle, sampling switch I_pos is closed to store the integration result obtained by charge integrator I during the $1^{st}$ half cycle in $C_p$ of sensing signal processing block I. Likewise sampling switch Q_pos is closed to store the integration result obtained by charge integrator Q during the $1^{st}$ half cycle in $C_p$ of sensing signal processing block Q.

In Step 810, demodulator switches I and Q are opened and reset switches I and Q are closed to reset charge integrators I and Q.

In Step 812, reset switches I and Q are opened. Demodulator switch I is closed to perform an integration of the resulting signal from receiver electrode A by charge integrator I to obtain an integration result. Further, demodulator switch Q is closed to perform an integration of the resulting signal from receiver electrode B by charge integrator Q to obtain an integration result.

In step 814, prior to end of the second half cycle, sampling switch I_neg is closed to store the integration result obtained by charge integrator I during the $2^{nd}$ half cycle in $C_n$ of sensing signal processing block I. Likewise sampling switch Q_neg is closed to store the integration result obtained by charge integrator Q during the $2^{nd}$ half cycle in $C_n$ of sensing signal processing block Q.

In Step 816, an I demodulation, by demodulator module I, is performed on the integration result of charge integrator I, and an I demodulation, by demodulator module Q, is performed on the integration result of charge integrator Q. The I demodulation by demodulator module I may be performed based on the integration results stored in $C_p$ and $C_n$ of sensing signal processing block I. The Q demodulation, by demodulator module Q, may be performed based on the integration results stored in $C_p$ and $C_n$ of sensing signal processing block Q. I components for the sensing signals associated with the resulting signals from receive electrodes A and B are, thus, obtained.

Additional steps may follow. For example, in configurations that use the simultaneous I sensing on receiver electrodes A and B, the sensing signals may be processed to detect a touch location in a sensing region accommodating the receive electrodes A and B.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for an input device, comprising:
an in-phase and quadrature (I/Q) receiver module comprising:
a first charge integrator,
a second charge integrator,
a first demodulator module, and
a second demodulator module; and
the I/Q receiver module configured to, when in a first operating mode:
alternate integration of a first resulting signal, received from a first receiver electrode of the input device, between the first charge integrator and the second charge integrator in four consecutive quarter cycles, to obtain four consecutive integration results,
wherein the four consecutive quarter cycles coincide with one cycle of a local oscillator signal for the first demodulator module and the second demodulator module, and
alternate demodulation of the four consecutive integration results between the first demodulator module and the second demodulator module,
wherein the first demodulator module performs a first in-phase demodulation to produce a first in-phase (I) component of a first sensing signal associated with the first resulting signal, and
wherein the second demodulator module performs a quadrature demodulation to produce a quadrature (Q) component of the first sensing signal.

2. The processing system of claim 1, wherein the I/Q receiver module is further configured to, when in the first operating mode:
combine the first I component of the first sensing signal and the Q component of the first sensing signal to obtain at least one selected from the group consisting of an amplitude and a phase of the first sensing signal.

3. The processing system of claim 1, wherein alternating the integration of the first resulting signal when in the first operating mode comprises:
during a first quarter cycle of the four consecutive quarter cycles:
obtaining, by the first charge integrator, a first integration result of the four integration results by a first integration of the first resulting signal, and
resetting the second charge integrator,
during a second quarter cycle of the four consecutive quarter cycles:
obtaining a second integration result of the four integration results by a second integration of the first resulting signal by the second charge integrator, and
resetting the first charge integrator,
during a third quarter cycle of the four consecutive quarter cycles:
obtaining a third integration result of the four integration results by a third integration of the first resulting signal by the first charge integrator, and
resetting the second charge integrator,
during a fourth quarter cycle of the four consecutive quarter cycles:
obtaining a fourth integration result of the four integration results by a fourth integration of the first resulting signal by the second charge integrator, and
resetting the first charge integrator.

4. The processing system of claim 1, wherein the I/Q receiver module further comprises a set of switches for configuring the I/Q receiver module to operate in one of the first operating mode and a second operating mode.

5. The processing system of claim 4,
wherein the set of switches comprises:
a first demodulator switch at an input of the first charge integrator, and
a second demodulator switch at an input of the second charge integrator,
wherein, during a first quarter cycle and a third quarter cycle of the four consecutive quarter cycles:
the first demodulator switch is closed to pass the first resulting signal to the first charge integrator, and
the second demodulator switch is open, and wherein, during a second quarter cycle and a fourth quarter cycle of the four consecutive quarter cycles:
the second demodulator switch is closed to pass the first resulting signal to the second charge integrator, and
the first demodulator switch is open.

6. The processing system of claim 4,
wherein the set of switches comprises:
a reset switch of the first charge integrator, and
a reset switch of the second charge integrator,
wherein, during the first quarter cycle and the third quarter cycle of the four consecutive quarter cycles:
the reset switch of the second charge integrator is closed to reset the second charge integrator, and
the reset switch of the first charge integrator is open, and
wherein, during a second quarter cycle and a fourth quarter cycle of the four consecutive quarter cycles:
the reset switch of the first charge integrator is closed to reset the first charge integrator, and
the reset switch of the second charge integrator is open.

7. The processing system of claim 4,
wherein the set of switches comprises:
a first sampling switch configured to connect a first hold capacitor to an output of the first charge integrator,
a second sampling switch configured to connect a second hold capacitor to the output of the first charge integrator,
a third sampling switch configured to connect a third hold capacitor to an output of the second charge integrator, and
a fourth sampling switch configured to connect a fourth hold capacitor to an output of the second charge integrator,
wherein during a first quarter cycle of the four consecutive quarter cycles:
prior to the first quarter cycle ending, the first sampling switch is closed to store a first integration result of the four consecutive integration results in the first hold capacitor, and
the second sampling switch, the third sampling switch, and the fourth sampling switch are open,
wherein during a second quarter cycle of the four consecutive quarter cycles:
prior to the second quarter cycle ending, the third sampling switch is closed to store a second integration result of the four consecutive integration results in the third hold capacitor,
the first sampling switch, the second sampling switch, and the fourth sampling switch are open,
wherein during a third quarter cycle of the four consecutive quarter cycles:
prior to the third quarter cycle ending, the second sampling switch is closed to store a third integration result of the four consecutive integration results in the second hold capacitor,
the first sampling switch, third sampling switch, and fourth sampling switch are open, and
wherein during a fourth quarter cycle of the four consecutive quarter cycles:
prior to the fourth quarter cycle ending, the fourth sampling switch is closed to store a fourth integration result of the four consecutive integration results in the fourth hold capacitor,
the first sampling switch, the second sampling switch, and the third sampling switch are open.

8. The processing system of claim 1,
wherein the I/Q receiver module further comprises hold capacitors coupled to the first charge integrator and the second charge integrator and configured to hold the four consecutive integration results.

9. The processing system of claim 1,
wherein the I/Q receiver module is further configured to, when in a second operating mode:
  integrate a second resulting signal, received from the first receiver electrode, by the first charge integrator, to obtain a second integration result,
  integrate a third resulting signal, received from a second receiver electrode, by the second charge integrator, to obtain a third integration result,
  perform, by the first demodulator module, a second in-phase demodulation using the second integration result to produce a second I component of a second sensing signal associated with the second resulting signal, and
  perform, by the second demodulator module, a third in-phase demodulation using the third integration result to produce a third I component of a third sensing signal associated with the third resulting signal.

10. An input device, comprising:
a plurality of receiver electrodes disposed in a sensing region of the input device; and
a processing system, comprising:
  a first in-phase and quadrature (I/Q) receiver module interfacing with a first receiver electrode of the plurality of receiver electrodes and a second receiver electrode of the plurality of receiver electrodes, the first I/Q receiver module comprising:
    a first charge integrator,
    a second charge integrator,
    a first demodulator module, and
    a second demodulator module; and
  the first I/Q receiver module configured to, when in a first operating mode:
    alternate integration of a first resulting signal, received from the first receiver electrode, between the first charge integrator and the second charge integrator in four consecutive quarter cycles, to obtain four consecutive integration results,
      wherein the four consecutive quarter cycles coincide with one cycle of a local oscillator signal for the first demodulator module and the second demodulator module, and
    alternate demodulation of the four consecutive integration results between the first demodulator module and the second demodulator module,
      wherein the first demodulator module performs a first in-phase demodulation to produce a first in-phase (I) component of a first sensing signal associated with the first resulting signal, and
      wherein the second demodulator module performs a quadrature demodulation to produce a quadrature (Q) component of the first sensing signal.

11. The input device of claim 10, wherein the processing system further comprises:
a second I/Q receiver module interfacing with a third receiver electrode of the plurality of receiver electrodes and a fourth receiver electrode of the plurality of receiver electrodes.

12. The input device of claim 10, wherein alternating the integration of the first resulting signal when in the first operating mode comprises:
during a first quarter cycle of the four consecutive quarter cycles:
  obtaining, by the first charge integrator, a first integration result of the four integration results by a first integration of the first resulting signal, and
  resetting the second charge integrator,
during a second quarter cycle of the four consecutive quarter cycles:
  obtaining a second integration result of the four integration results by a second integration of the first resulting signal by the second charge integrator, and
  resetting the first charge integrator,
during a third quarter cycle of the four consecutive quarter cycles:
  obtaining a third integration result of the four integration results by a third integration of the first resulting signal by the first charge integrator, and
  resetting the second charge integrator, and
during a fourth quarter cycle of the four consecutive quarter cycles:
  obtaining a fourth integration result of the four integration results by a fourth integration of the first resulting signal by the second charge integrator, and
  resetting the first charge integrator.

13. The input device of claim 10, wherein the first I/Q receiver module further comprises a set of switches for configuring the first I/Q receiver module to operate in one of the first operating mode and a second operating mode.

14. The input device of claim 13,
wherein, when operating in the second operating mode, the first I/Q receiver module is configured to:
  integrate a second resulting signal, received from the first receiver electrode, by the first charge integrator to obtain a second integration result,
  integrate a third resulting signal, received from the second receiver electrode, by the second charge integrator to obtain a third integration result,
  perform, by the first demodulator module, a second in-phase demodulation using the second integration result to produce a second I component of a second sensing signal associated with the second resulting signal, and
  perform, by the second demodulator module, a third in-phase demodulation using the third integration result to produce a third I component of a third sensing signal associated with the third resulting signal.

15. The input device of claim 13,
wherein the set of switches comprises:
  a first demodulator switch at an input of the first charge integrator, and
  a second demodulator switch at an input of the second charge integrator,
  wherein, during a first quarter cycle and a third quarter cycle of the four consecutive quarter cycles:
    the first demodulator switch is closed to pass the first resulting signal to the first charge integrator, and
    the second demodulator switch is open.

16. The input device of claim 13,
wherein the set of switches comprises:
  a reset switch of the first charge integrator, and
  a reset switch of the second charge integrator, and
  wherein, during the first quarter cycle and the third quarter cycle of the four consecutive quarter cycles:
    the reset switch of the second charge integrator is closed to reset the second charge integrator, and
    the reset switch of the first charge integrator is open.

17. The input device of claim 13,
wherein the set of switches comprises:
- a first sampling switch configured to connect a first hold capacitor to an output of the first charge integrator,
- a second sampling switch configured to connect a second hold capacitor to the output of the first charge integrator,
- a third sampling switch configured to connect a third hold capacitor to an output of the second charge integrator, and
- a fourth sampling switch configured to connect a fourth hold capacitor to an output of the second charge integrator, and wherein during a first quarter cycle of the four consecutive quarter cycles:
- prior to the first quarter cycle ending, the first sampling switch is closed to store a first integration result of the four consecutive integration results in the first hold capacitor, and
- the second sampling switch, the third sampling switch, and the fourth sampling switch are open.

18. A method for operating an input device, the method comprising, when operating in a first operating mode:
- alternating integration of a first resulting signal, received from a first receiver electrode of the input device, between a first charge integrator and a second charge integrator in four consecutive quarter cycles, to obtain four consecutive integration results,
  - wherein the four consecutive quarter cycles coincide with one cycle of a local oscillator signal for a first demodulator module and a second demodulator module; and
- alternating demodulation of the four consecutive integration results between the first demodulator module and the second demodulator module, by:
  - performing, by the first demodulator module, a first in-phase demodulation to produce a first in-phase (I) component of a first sensing signal associated with the first resulting signal; and
  - performing, by the second demodulator module, a quadrature demodulation to produce a quadrature (Q) component of the first sensing signal.

19. The method of claim 18, wherein alternating the integration of the first resulting signal when in the first operating mode comprises:
- during a first quarter cycle of the four consecutive quarter cycles:
  - obtaining, by the first charge integrator, a first integration result of the four integration results by a first integration of the first resulting signal, and
  - resetting the second charge integrator,
- during a second quarter cycle of the four consecutive quarter cycles:
  - obtaining a second integration result of the four integration results by a second integration of the first resulting signal by the second charge integrator, and
  - resetting the first charge integrator,
- during a third quarter cycle of the four consecutive quarter cycles:
  - obtaining a third integration result of the four integration results by a third integration of the first resulting signal by the first charge integrator, and
  - resetting the second charge integrator, and
- during a fourth quarter cycle of the four consecutive quarter cycles:
  - obtaining a fourth integration result of the four integration results by a fourth integration of the first resulting signal by the second charge integrator, and
  - resetting the first charge integrator.

20. The method of claim 18, the method further comprising, when operating in a second operating mode:
- integrating a second resulting signal, received from the first receiver electrode, by the first charge integrator to obtain a second integration result;
- integrating a third resulting signal, received from a second receiver electrode, by the second charge integrator to obtain a third integration result,
- performing, by the first demodulator module, a second in-phase demodulation using the second integration result to produce a second I component of a second sensing signal associated with the second resulting signal, and
- performing, by the second demodulator module, a third in-phase demodulation using the third integration result to produce a third I component of a third sensing signal associated with the third resulting signal.

\* \* \* \* \*